(12) United States Patent
Steinberg

(10) Patent No.: US 7,163,758 B2
(45) Date of Patent: Jan. 16, 2007

(54) INTEGRATED PLASMA FUEL CELL PROCESS

(75) Inventor: Meyer Steinberg, Melville, NY (US)

(73) Assignee: HCE, LLC, Oakton, VA (US)

( * ) Notice: Subject to any disclaimer, the term of this patent is extended or adjusted under 35 U.S.C. 154(b) by 380 days.

(21) Appl. No.: 10/604,961

(22) Filed: Aug. 28, 2003

(65) Prior Publication Data
US 2006/0024538 A1 Feb. 2, 2006

Related U.S. Application Data

(63) Continuation-in-part of application No. 10/604,153, filed on Jun. 27, 2003, now abandoned.

(51) Int. Cl.
*H01M 8/04* (2006.01)
(52) U.S. Cl. .............. 429/16; 429/15; 429/17; 429/33
(58) Field of Classification Search ............ 429/15–17, 429/33
See application file for complete search history.

(56) References Cited

U.S. PATENT DOCUMENTS

| 4,202,167 A | 5/1980 | Suggitt |
| 4,490,445 A | 12/1984 | Hsu |
| 4,555,526 A | 11/1985 | Wakui |
| 5,298,340 A * | 3/1994 | Cocks et al. ............. 429/13 |
| 5,344,849 A | 9/1994 | Ayasse |
| 5,378,339 A | 1/1995 | Aoki |
| 5,472,986 A | 12/1995 | Van Dijk |
| 6,505,467 B1 | 1/2003 | Fjelhaug |
| 2002/0106549 A1* | 8/2002 | Cooper et al. .......... 429/40 |
| 2002/0120017 A1 | 8/2002 | Bohn |
| 2002/0174659 A1 | 11/2002 | Viteri |

OTHER PUBLICATIONS

Steinberg, M.S., "An Innovative Highly Efficient Combined Cycle Fossil and Biomass Fuel Power Generation and Hydrogen Production Plant with Zero CO2 Emission", 2nd Int'l Conf on Carbon Sequestration, US DOE, Alexandria, VA, May 6-8, and paper of Mar. 2003.*

Gaudernack, et al., Hydrogen from Natural Gas without Release of CO2 to the Atmosphere, Proceedings of the 11th World Hydrogen Energy Conference, Jun. 23-28, 1996, pp. 511-523, Stuttgart, Germany.

* cited by examiner

*Primary Examiner*—Mark Ruthkosky
(74) *Attorney, Agent, or Firm*—Louis Ventre, Jr.

(57) ABSTRACT

A method for efficiently producing energy, carbon, carbon monoxide, synthetic carbonaceous liquid and gaseous fuels and hydrogen from fossil or biomass fuels with minimal carbon dioxide emissions. The method includes using an Electric Arc Hydrogen Plasma Black Reactor wherein hydrogen, carbon monoxide, carbon, ash and sulfur are produced and using a Direct Carbon Fuel Cell wherein a molten salt delivers the carbon produced from the reactor as a feedstock in the fuel cell to produce electricity and hot carbon dioxide gas.

9 Claims, 2 Drawing Sheets

INTEGRATED PLASMA FUEL CELL PROCESS

CROSS REFERENCE TO RELATED APPLICATIONS

This is a Continuation-in-Part (CIP) Application of U.S. application Ser. No. 10/604,153 filed Jun. 27, 2003, now abandoned. This CIP application claims the benefit of the filing date of patent application Ser. No. 10/604,153 filed Jun. 27, 2003, now abandoned.

BACKGROUND OF INVENTION

This method described herein combines two known technologies to significantly improve the efficiency of energy, carbon, carbon monoxide and hydrogen production starting with a carbon-based feedstock. This higher efficiency produces fewer gaseous and solid pollutants and fewer global warming emissions.

Contributory benefits of the claimed combination arise from claimed subcombinations with other known technologies, which greatly enhance the production of hydrogen, oxygen, energy, synthetic carbonaceous gaseous fuels and synthetic carbonaceous liquid fuels. In addition, these subcombinations easily enable the collection of almost all the carbon dioxide produced.

An object of the invention is a highly efficient process for producing energy in the form of electricity and steam from carbonaceous fuels. A further object is to produce carbon from carbonaceous fuels. A further object is the production of hydrogen gas, synthetic carbonaceous gaseous fuels, and synthetic carbonaceous liquid fuels from carbonaceous fuels. Carbonaceous fuels are fossil fuels, such as natural gas, oil, coal, and biomass. Synthetic carbonaceous gaseous fuels are methane and $C_1$ to $C_4$ hydrocarbons. Synthetic carbonaceous liquid fuels are methanol, gasoline and diesel fuel.

A further object of the invention is a process that will produce energy, carbon and hydrogen with low or zero carbon dioxide emissions.

A further object of the invention is to produce hydrogen in support of a "United States" goal to reduce American reliance on foreign oil through a balance of new domestic energy production and new technology to promote greater energy efficiency. Producing hydrogen for these purposes is consistent with the United States Department of Energy's FreedomCAR program, which is a joint government and private sector research effort on advanced, efficient fuel cell technology which uses hydrogen to power automobiles without creating any pollution.

However, producing hydrogen from existing technologies often involves processes that generate more pollution than would have been produced by direct utilization of the fuels used to create the hydrogen.

Thus, achieving these objects will have significant benefits to the environment and the communities producing electricity and promoting utilization of hydrogen as an alternative clean burning fuel.

The subject invention is for a low emission, advanced combined cycle for fossil- and biomass-fueled power generation, for hydrogen production, for synthetic carbonaceous liquid fuels, for synthetic carbonaceous gaseous fuels, and for carbon production to achieve these objects. In the method of the invention, two to nine technologies, known in the art, are combined in various integrated processes. The combinations are unique and in the means for integrating two of the technologies is new. The nine technologies include an Electric Arc Hydrogen Plasma Black Reactor, a Molten Carbonate Direct Carbon Fuel Cell, a Water Gas Shift Reactor, a Solid Oxide Fuel Cell, a Water Electrolyzer, a Fischer-Tropsch Catalytic Reactor, a Methanol Catalytic Converter, a Catalytic Methanator and a Steam Boiler Rankine Cycle. In addition, the concept of combining an Electric Arc Hydrogen Plasma Black Reactor with a Direct Carbon Fuel Cell by cycling a molten salt between the two technologies is new.

The Direct Carbon Fuel Cell has been described in literature and is under development at the United States Department of Energy at its Lawrence Livermore National Laboratory. The Electric Arc Hydrogen Plasma Black Reactor was in commercial use in Canada producing carbon black. The Water Gas Shift Reactor, the Steam Boiler Rankine Cycle, the Solid Oxide Fuel Cell, the Fischer-Tropsch Catalytic Reactor, the Methanol Catalytic Converter, the Catalytic Methanator, and the Water Electrolyzer are well known and in commercial use.

SUMMARY OF INVENTION

A method for producing energy, principally electrical energy, carbon, carbon monoxide, and hydrogen from fossil or biomass fuel, such method combining the use of an Electric Arc Hydrogen Plasma Black Reactor and a molten carbonate Direct Carbon Fuel Cell. Claimed combinations permit highly efficient production of hydrogen, oxygen, energy, synthetic carbonaceous liquid fuels and synthetic carbonaceous gaseous fuels, with minimal carbon dioxide emissions. These add one or more of the following: a Water Gas Shift Reactor, a Solid Oxide Fuel Cell, a Fischer-Tropsch Catalytic Reactor, a Methanol Catalytic Converter, a Catalytic Methanator, a Water Electrolyzer and a Steam Boiler Rankine Cycle.

These and other objects will be apparent to those having ordinary skill in the art. The method of the invention describes an advanced combined cycle for fossil and biomass fueled power generation and carbon, carbon monoxide, oxygen, synthetic carbonaceous liquid fuels, synthetic carbonaceous gaseous fuels and hydrogen production.

In the method of the invention, an Electric Arc Hydrogen Plasma Black Reactor decomposes a carbonaceous fuel (natural gas, oil, coal and biomass) to elemental carbon, hydrogen, carbon monoxide, ash and sulfur. The elemental carbon is used in commerce and is fed to a molten carbonate Direct Carbon Fuel Cell, which in turn produces electrical power and hot off gases.

The products from this combination of the Electric Arc Hydrogen Plasma Black Reactor and the Direct Carbon Fuel Cell are also utilized in five alternative embodiments to produce one or more of the following products: high purity hydrogen, high purity carbon dioxide, synthetic carbonaceous liquid and gaseous fuels, electricity, steam and high purity oxygen.

Carbon dioxide emissions from the invention are used in commerce, that is, some combination of selling it, sequestering it from the environment or discharging it as a waste. Carbon dioxide emissions are significantly reduced due to an increase in overall efficiency of power production of about two times that achievable with conventional power plants. Since the carbon dioxide is highly concentrated, the carbon dioxide can be sequestered to reduce emission towards zero with much less energy loss than required by conventional power plants.

Carbon dioxide sequestration is commercially practiced at a North Sea gas production station where it is pumped under the North Sea. Other sequestration methodologies have been proposed, such as pumping into depleted gas and oil wells and in methane bedded coal seams.

DETAILED DESCRIPTION

The method of the invention describes a combined-cycle power, hydrogen and carbon production plant using carbonaceous fuels as feedstock. As used herein, carbonaceous fuels are natural gas, oil, coal and biomass; and, fossil fuels are natural gas, oil, and coal. The combined cycle plant is highly efficient with a potential for very low carbon dioxide emissions.

Figure 1:
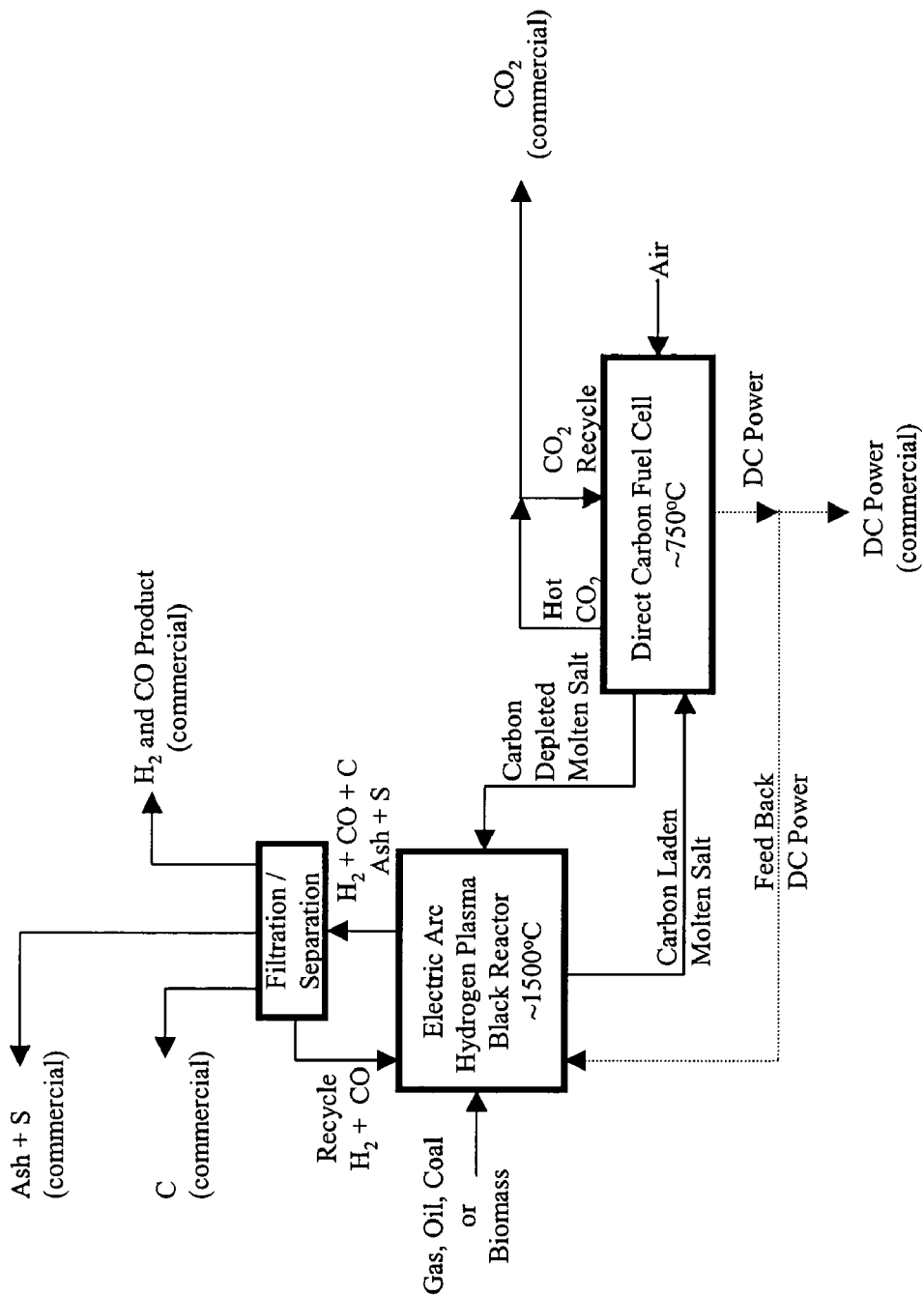
FIG. 1 illustrates the embodiment of the invention combining the use of the Electric Arc Hydrogen Plasma Black Reactor with the Direct Carbon Fuel Cell. The boxes are intended to represent equipment essential to the process with labeled arrows showing primary inputs and outputs.
Figure 2:
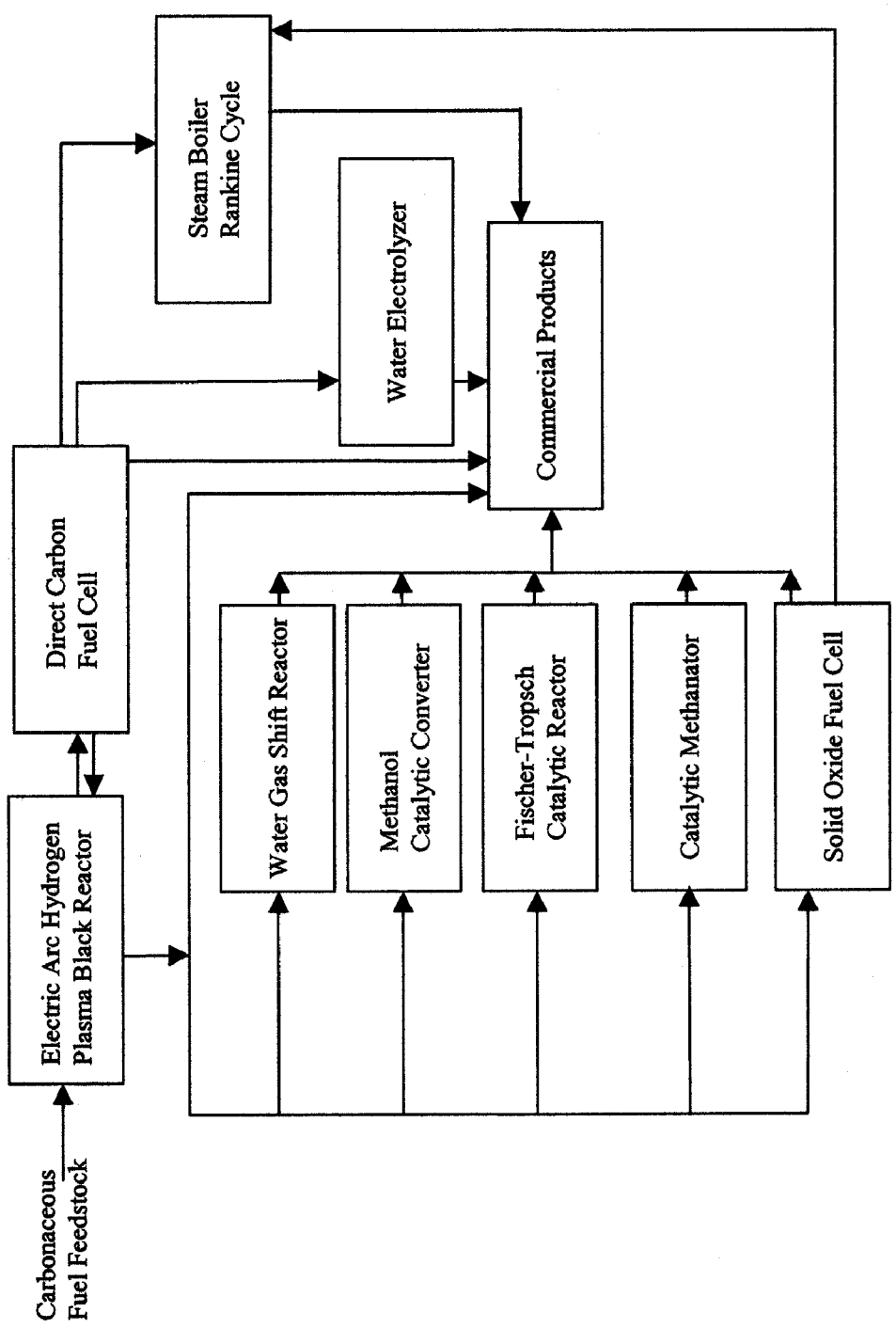
FIG. 2 illustrates a field of alternative embodiments adding steps for using one or more of the component equipment displayed in the boxes.

The combined cycle plant produces energy products, principally electrical energy, and carbon, carbon monoxide, carbon dioxide, ash, sulfur and hydrogen from fossil or biomass fuels. As shown in FIG. 1, the method claims the integrated use of an Electric Arc Hydrogen Plasma Black Reactor and a molten carbonate Direct Carbon Fuel Cell. The products or outputs of these two components can be used without further processing or can be combined, in alternative embodiments, with one or more other well known equipment to produce steam and electrical energy, liquid and gaseous fuels, and concentrated, that is, high purity gases. The sum total of all these alternative embodiments combined is conceptually displayed in FIG. 2. These alternative embodiments add to the method of the invention one or more steps for using one or more of the following equipment: a Water Gas Shift Reactor, a Fischer-Tropsch Catalytic Reactor, and a Methanol Catalytic Converter, a Water Electrolyzer, a Solid Oxide Fuel Cell and a Steam Boiler Rankine Cycle plant.

In the method of the invention, there is a first step for using an Electric Arc Hydrogen Plasma Black Reactor wherein hydrogen, carbon monoxide, carbon, ash and sulfur are produced and used. The feedstock for said Reactor is a carbonaceous fuel. Use of an Electric Arc Hydrogen Plasma Black Reactor, well known in the art, consumes carbonaceous fuel by creating a hydrogen plasma in a continuous cracking process.

The useful effluent solid and gases from the Electric Arc Hydrogen Plasma Black Reactor are carbon, hydrogen, and carbon monoxide. As used herein, only useful outputs from the process steps are noted. Nonuseful outputs from all of the process steps, such as gaseous compounds of nitrogen and sulfur and ash, are well known in the art and are not further noted herein, except to observe that they would be sold if possible or discharged in the usual fashion as wastes in a form compliant with environmental regulations.

As shown in FIG. 1, the Electric Arc Hydrogen Plasma Black Reactor is powered by electricity obtained from the operation of a Direct Carbon Fuel Cell. An alternate power supply is required to initiate startup of the system.

Temperatures of the order of 1500 degrees centigrade are achieved in the hydrogen plasma between carbon electrodes where one or more carbonaceous fuels are introduced. At the process temperature, natural gas and oil fuels are cracked to carbon and hydrogen in one pass. For coal and biomass fuels, oxygen present in these fuels combines with some of the carbon to primarily produce carbon monoxide.

Carbon, produced in elemental form in the hydrogen plasma, is both entrained as particulates in the off gases and captured from the hydrogen plasma in a molten salt.

Part of the hydrogen stream containing the entrained carbon particulates in the off-gases are collected through filtering and are used in commerce, that is, sold for other uses.

As shown in FIG. 1, a molten salt serves as a working fluid and carbon transfer medium in both the Electric Arc Hydrogen Plasma Black Reactor and the Direct Carbon Fuel Cell. The molten salt is a molten carbonate salt of lithium and potassium, or sodium and potassium.

The molten carbonate salt is circulated in a section below the carbon arc electrodes in the Electric Arc Hydrogen Plasma Black Reactor. The molten carbonate salt is in direct contact with the hydrogen gas effluent from the plasma in an entrained fashion to scrub the carbon particulates out of the hydrogen stream. The carbon thus becomes dispersed in the molten carbonate, creating a carbon laden molten salt. Carbon is also separated from the molten salt as is needed for its commercial use. The remaining carbon in the molten salt is sent to Direct Carbon Fuel Cell for consumption in another step of the process.

Ash, and sulfur as hydrogen sulfide gas, are emitted from the Electric Arc Hydrogen Plasma Black Reactor and are either captured in the molten carbonate salt or remain in the hydrogen off gas stream. These products have commercial value in addition to being disposable wastes.

As shown in FIG. 1, the ash and sulfur are separated from the other effluents by means well known in the art, that is, typically by solids density difference in the effluent by bag filtering, and by scrubbing the effluent hydrogen stream. Thus, the step for using the Electric Arc Hydrogen Plasma Black Reactor involves use of the separated ash, sulfur, carbon, hydrogen and carbon monoxide effluents. Such use typically includes any commercial use such as selling any such effluent or discharging one or more of them as waste.

The process efficiency of the Electric Arc Hydrogen Plasma Black Reactor varies with the carbonaceous fuel used and is in the range of 50 percent to 60 percent.

In the method of the invention, there is a second step, which is a step for using a Direct Carbon Fuel Cell wherein electricity and hot carbon dioxide gas are produced and used. The feedstock for the Direct Carbon Fuel Cell is the carbon from the Electric Arc Hydrogen Plasma Black Reactor.

Direct Carbon Fuel Cell equipment and process are known in the art. As shown in FIG. 1, the primary function of the Direct Carbon Fuel Cell in the subject invention is to consume carbon derived from the first step to produce electricity and hot carbon dioxide gas.

Electricity produced from the Direct Carbon Fuel Cell is direct current electrical energy. Using the electricity firstly involves recycling some of the electricity to the Electric Arc Hydrogen Plasma Black Reactor to power the hydrogen plasma. This also involves converting direct current to alternating current electricity as may be required by the Electric Arc Hydrogen Plasma Black Reactor. Using the electricity secondly involves selling power in the commercial market, that is, it is either sold directly or converted to alternating current as required by the market. In alternative embodiments, using the electricity involves the electrolysis of water in a Water Electrolyzer, creating pure streams of hydrogen and oxygen.

In using the Direct Carbon Fuel Cell, the particulate carbon is removed from the carbon laden molten salt feedstock and converted to hot carbon dioxide, which emerges as an effluent from the anode compartment of the Direct Carbon Fuel Cell at 100 percent concentration. The carbon depleted molten salt is then re-circulated to the Electric Arc Hydrogen Plasma Black Reactor.

Air is consumed in the cathode compartment of the Direct Carbon Fuel Cell to provide oxygen for the process. The nonuseful gases remaining in the air after the oxygen is consumed are vented as waste. Heat generated in the Direct Carbon Fuel Cell is resident in the hot carbon dioxide gas effluent. Typically, the Direct Carbon Fuel Cell operates at temperatures about 700 to 800 degrees centigrade. Using said hot carbon dioxide gas first involves one or more of the following activities: selling it, sequestering it from the environment or discharging it as a waste. Using said hot carbon dioxide gas secondly involves returning part of it to the cathode compartment of the Direct Carbon Fuel Cell. In the cathode compartment, the returned or recycled carbon dioxide is used to form carbonate ions in the molten carbonate, which in turn is used for transferring oxygen thru the molten carbonate salt electrolyte to react with the carbon in the anode compartment to form carbon dioxide.

In alternative embodiments, using said hot carbon dioxide gas firstly involves sending it to a Steam Boiler Rankine Cycle; and secondly involves partially returning it to the cathode compartment of the Direct Carbon Fuel Cell. These alternative embodiments add a step for using the Steam Boiler Rankine Cycle wherein steam is produced and used. Using a Steam Boiler Rankine Cycle involves extracting the heat from the hot carbon dioxide gas from the Direct Carbon Fuel Cell. Using the steam involves producing electricity and cooled carbon dioxide gas and using the steam and products in commerce. Using the electricity and steam in commerce includes either consuming them for on-site process purposes or selling them for off-site use. Using the cooled carbon dioxide gas in commerce involves one or more of the following activities: selling it, sequestering it from the environment or discharging it as a waste.

The Direct Carbon Fuel Cell can operate at up to 90% efficiency producing electricity. Carbon dioxide from the Direct Carbon Fuel Cell is highly concentrated and can be directly used, that is, sequestered or sold for other uses.

Alternative embodiments of the invention add a step for using a Water Gas Shift Reactor to the process described in FIG. 1 wherein hydrogen, carbon monoxide and carbon dioxide are produced and used. The feedstock for the Water Gas Shift Reactor is the hydrogen and carbon monoxide produced in the Electric Arc Hydrogen Plasma Black Reactor.

The Water Gas Shift Reactor is well known in the art. In all embodiments of the invention including a step for using the Water Gas Shift Reactor, said Water Gas Shift Reactor inputs carbon monoxide and hydrogen from the Electric Arc Hydrogen Plasma Black Reactor and steam to output hydrogen, carbon monoxide and carbon dioxide gases. The chemical process in the Water Gas Shift Reactor involves combining carbon monoxide and water to yield carbon dioxide and hydrogen. The inputted hydrogen adds to the total amount of hydrogen outputted. Thus, some of the hydrogen and all of the carbon monoxide outputs from the Water Gas Shift Reactor can also be thought of as pass-through gases from the Electric Arc Hydrogen Plasma Black Reactor. The Water Gas Shift Reactor typically operates below 500 degrees centigrade.

The Water Gas Shift Reactor process operations are enhanced by the addition of carbon dioxide. Thus, in alternative embodiments, steam and carbon dioxide is supplied to the Water Gas Shift Reactor from a Solid Oxide Fuel Cell.

In alternative embodiments, the output hydrogen, carbon dioxide and carbon monoxide gases from the Water Gas Shift Reactor are used. Using these gases includes one or more of the following: selling the gases for off-site use or using them for on-site process operations.

Use of the output hydrogen gas and carbon dioxide gas from the Water Gas Shift Reactor firstly involves separating the gases by means well known in the art into a concentrated stream of carbon dioxide gas and a concentrated stream of hydrogen gas. Carbon dioxide is separated from the hydrogen to purify a hydrogen gas product. This is typically accomplished by pressure swing adsorption, separating with a membrane or scrubbing with a solvent. Use of the carbon dioxide gas secondly involves some combination of selling it, sequestering it from the environment or discharging it as a waste. Sequestering it is by means well known in the art, which reduces or eliminates carbon dioxide emission to the atmosphere. Use of the separated hydrogen gas secondly involves selling it for other commercial uses.

Use of the output hydrogen and carbon monoxide gases involves one or more of the following: selling the gases for off-site use or using them for on-site process operations.

Other embodiments incorporate well-known equipment to use the hydrogen and carbon monoxide gases from the Water Gas Shift Reactor and the Electric Arc Hydrogen Plasma Black Reactor. For example, in these embodiments, the hydrogen and carbon monoxide are used by sending them as feedstocks to one or more of the following equipment: a Solid Oxide Fuel Cell, a Methanol Catalytic Converter, a Fischer-Tropsch Catalytic Reactor, and a Catalytic Methanator. Accordingly, these embodiments include a step for using one or more of such equipment wherein the outputs from them are used.

For the Solid Oxide Fuel Cell the outputs are electricity, and hot carbon dioxide and water. For the Methanol Catalytic Converter, the outputs are methanol and water. For the Fischer-Tropsch Catalytic Reactor, the outputs are gasoline and diesel fuels. For the Catalytic Methanator, the outputs are hydrocarbons having, as a part of their chemical formula, $CH_4$ to $C_4H_{10}$, also known as $C_1$ to $C_4$ hydrocarbons.

For alternative embodiments of the invention which include a step for using a Solid Oxide Fuel Cell, the hydrogen and carbon monoxide from the Water Gas Shift Reactor and/or the Electric Arc Hydrogen Plasma Black Reactor are consumed and electricity, carbon dioxide gas and water are produced and used.

In the Solid Oxide Fuel Cell, which is well known in the art, oxygen ions are transmitted through a ceramic membrane, which oxidizes the carbon monoxide and hydrogen gas to carbon dioxide and water and produces direct current electric energy. Using the Solid Oxide Fuel Cell involves sending some of the carbon dioxide and water to the Water Gas Shift Reactor as may be required to support its efficient operation. Using the Solid Oxide Fuel Cell further involves separating the remainder of the hot water and hot carbon dioxide into separate streams and using each stream in commerce. The separating process utilizes a condenser, which is well known in the art and which forms a liquid water stream and a concentrated carbon dioxide stream. Using the carbon dioxide stream involves one or more of the following activities: selling it, sequestering it from the environment or discharging it as a waste. Using the water stream involves one or more of selling it or discharging it as a waste.

Finally, using the Solid Oxide Fuel Cell involves producing and using electrical power in the commerce, that is, the produced electricity is either sold directly or converted to alternating current as required by the market.

The Solid Oxide Fuel Cell typically operates at about 900 degrees centigrade and is about 56 percent thermally efficient.

For alternative embodiments of the invention which include a step for using a Steam Boiler Rankine Cycle, the input energy to the Seam Boiler Rankine Cycle is extracted from the hot carbon dioxide gas from the Direct Carbon Fuel Cell and/or the hot carbon dioxide gas and water from the Solid Oxide Fuel Cell.

The Steam Boiler Rankine Cycle typically operates at about 550 degrees centigrade and about 60 atmospheres pressure. This process is well known in the art.

Using a Steam Boiler Rankine Cycle further involves outputting carbon dioxide, condensed water, steam and electricity. After the production of electricity, the outputted or discharged condensed water and carbon dioxide are sent to a condenser to provide the same separation and use of the carbon dioxide and condensed water streams as described above for the Solid Oxide Fuel Cell. In such use, the concentrated carbon dioxide is used in commerce, that is, some combination of selling it, sequestering it from the environment or discharging it as a waste.

Sequestration is accomplished by means well known in the art, to reduce or eliminate its emission to the atmosphere. The steam is used for one or more of the following: on-site process purposes, direct sale for an off-site use or producing electricity for on-site use or sale to others. A Steam Boiler Rankine Cycle is well known in the art and is about 38 percent thermally efficiency.

Alternative embodiments of the invention include a step for using one or more of the following equipment wherein the output products are then used in commerce: a Fischer-Tropsch Catalytic Reactor, a Methanol Catalytic Converter, and a Catalytic Methanator. Each is further discussed below. The feedstock for any such step for using is the hydrogen and carbon monoxide sent from the Hydrogen Plasma Black Reactor or the Water Gas Shift Reactor. In the step for using any of these equipment, water and synthetic carbonaceous hydrocarbon fuels are produced and used. Using the synthetic carbonaceous hydrocarbon products in commerce involves one or more of the following activities: using them on site, selling them for off-site use, or discharging them as waste. The amount of carbon monoxide produced by the Hydrogen Plasma Black Reactor and accordingly by the Water Gas Shift Reactor is adjusted by controlling of water content in the carbonaceous fuel fed to the Hydrogen Plasma Black Reactor. Controlling the water content is typically accomplished by adding steam.

Specifically, alternative embodiments which employ an additional step for using the Fischer-Tropsch Catalytic Reactor, produce and use in commerce water, gasoline and diesel fuels.

Alternative embodiments which employ an additional step for using a Methanol Catalytic Converter produce and use in commerce water and methanol.

Alternative embodiments which employ an additional step for using a Methanol Catalytic Converter produce and use in commerce methanol and water.

Alternative embodiments which employ an additional step for using a Water Electrolyzer produce and use in commerce hydrogen and oxygen. The feedstocks for the Water Electrolyzer are water from any available source and direct current electricity from the Direct Carbon Fuel Cell. The electricity provides the energy to split the water molecule. The outputs are high purity streams of hydrogen and oxygen.

In the method of the invention and all embodiments described herein, carbon dioxide is ready to be sequestered from concentrated streams of carbon dioxide gas. An important benefit of the process is that sequestering concentrated carbon dioxide uses much less energy than would be required for a dilute mixture from conventional power and hydrogen production plants.

For the embodiment of the invention encompassing a combined cycle involving the Electric Arc Hydrogen Plasma Black Reactor, the Direct Carbon Fuel Cell, the Water Gas Shift Reactor, the Solid Oxide Fuel Cell and the Steam Boiler Rankine Cycle, the calculated thermal efficiency for electricity production alone of the combined steps of the process ranges above 70 percent to exceeding 80 percent based on the Higher Heating Value of the carbonaceous fuel. Carbonaceous fuels are typically defined in terms of energy content, that is, Higher Heating Value and Lower Heating Value. This calculated efficiency range is about twice that typically obtained from conventional Steam Boiler Rankine Cycle power plants. Consequently, the quantity of carbon dioxide produced in the combined cycles of the process, will be about half that from conventional steam and gasification plants and are in such concentrations as to facilitate the operations to use it, that is sequestering it or selling it in the commercial market, at a minimum cost.

For the above described combined cycle, electricity and hydrogen production is accomplished at a thermal efficiency exceeding 90 percent based on the Higher Heating Value of the carbonaceous fuel. Consequently, the quantity of carbon dioxide produced in the combined cycles of the process will be about half that from conventional steam and gasification plants and are in such concentrations as to facilitate the operations to use it, that is sequestering it at a minimum cost or selling it in the commercial market.

While there has been described herein what is considered to be the preferred exemplary embodiment of the present invention, other modifications of the present invention shall be apparent to those skilled in the art from the teachings herein, and it is therefore, desired to be secured in the appended claim all such modifications as fall the true spirit and scope of the invention.

Accordingly, what is desired to be secured by Letters Patent of the United States the invention as defined and differentiated in the following claims in which I claim:

1. A method for the production of energy, carbon and hydrogen in a combined cycle, the method comprising the steps for
   (a) using an Electric Arc Hydrogen Plasma Black Reactor wherein hydrogen, carbon monoxide, carbon, ash and sulfur are produced and used and wherein said Reactor consumes a carbonaceous fuel;
   (b) using a Direct Carbon Fuel Cell wherein a molten salt delivers the carbon produced in step (a) as a feedstock and wherein electricity and hot carbon dioxide gas are produced and used;

(c) using a Water Gas Shift Reactor wherein the hydrogen, and carbon monoxide produced in step (a) is used and wherein water and carbon dioxide gases from step (d) are used and wherein hydrogen, carbon monoxide and carbon dioxide are produced and used;

(d) using a Solid Oxide Fuel Cell wherein hydrogen and carbon monoxide from step (c) are consumed and wherein electricity is produced and used and wherein carbon dioxide gas and water are produced and used;

(e) using a Steam Boiler Rankine Cycle wherein the hot carbon dioxide gas produced in the Direct Carbon Fuel Cell of step (b) is used, wherein the water and carbon dioxide gas produced in the Solid Oxide Fuel Cell of step (d) is used and wherein steam is produced and used.

2. A method for the production of energy, carbon, carbon monoxide and hydrogen from a carbonaceous fuel in a combined cycle, the method comprising (a) a step for using an Electric Arc Hydrogen Plasma Black Reactor wherein hydrogen, carbon monoxide, carbon, ash and sulfur are produced and used; and, (b) a step for using a Direct Carbon Fuel Cell wherein a molten salt delivers the carbon produced in step (a) as a feedstock and wherein electricity and hot carbon dioxide gas are produced and used.

3. The method of claim 2 further comprising a step for using a Steam Boiler Rankine Cycle wherein steam is produced and used.

4. The method of claim 2 further comprising a step for using a Water Gas Shift Reactor wherein hydrogen, carbon monoxide and carbon dioxide are produced and used.

5. The method of claim 2 further comprising a step for using a Solid Oxide Fuel Cell wherein electricity is produced and used and wherein carbon dioxide gas and water are produced and used.

6. The method of claim 2 further comprising a step for using a Fischer-Tropsch Catalytic Reactor wherein water and gasoline and diesel fuel are produced and used.

7. The method of claim 2 further comprising a step for using a Methanol Catalytic Converter wherein water and methanol are produced and used.

8. The method of claim 2 further comprising a step for using a Catalytic Methanator wherein water, gaseous methane and $C_1$ to $C_4$ hydrocarbons are produced and used.

9. The method of claim 2 further comprising a step for using a Water Electrolyzer wherein hydrogen and oxygen are produced and used.

* * * * *